Patented Apr. 4, 1944

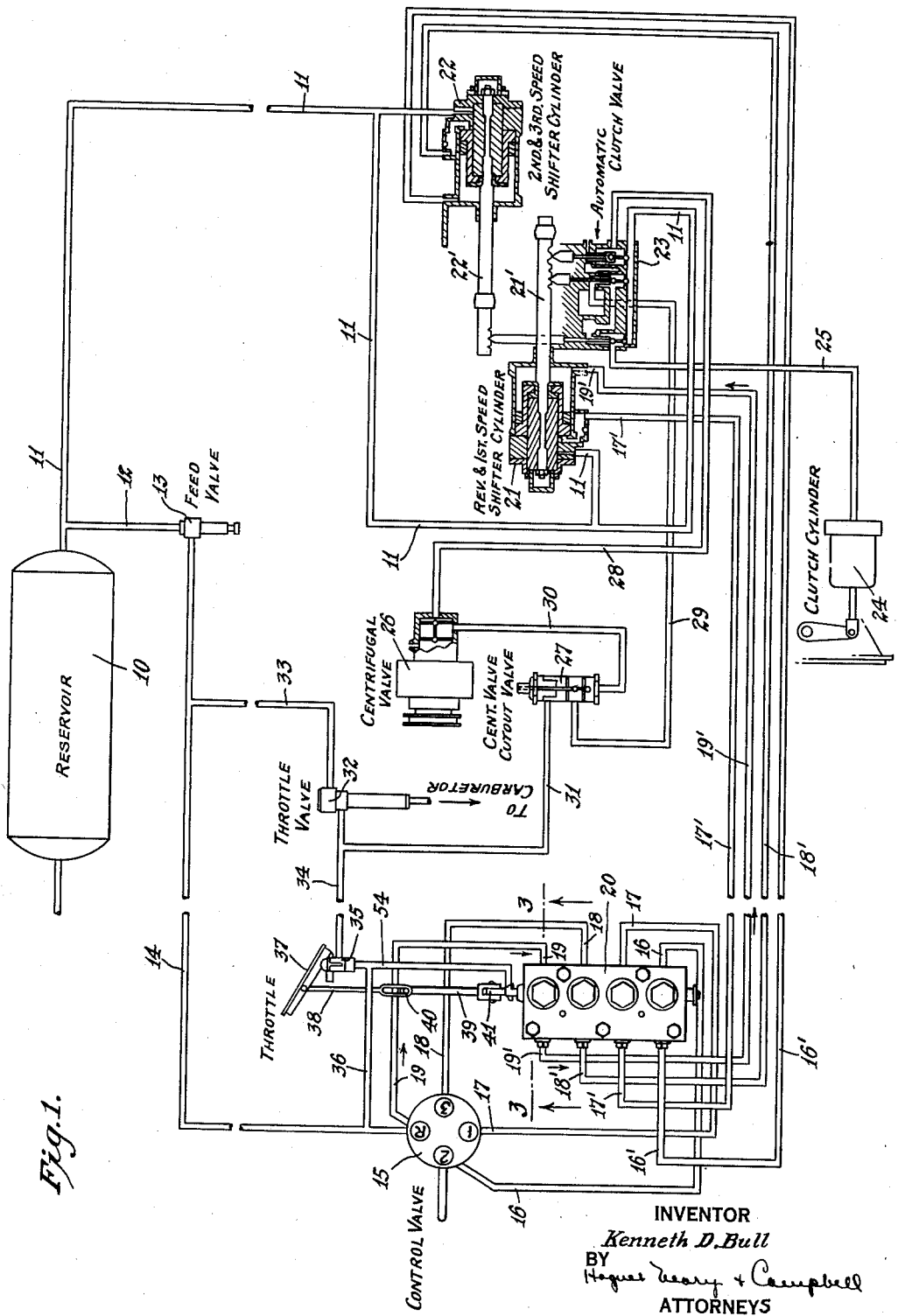

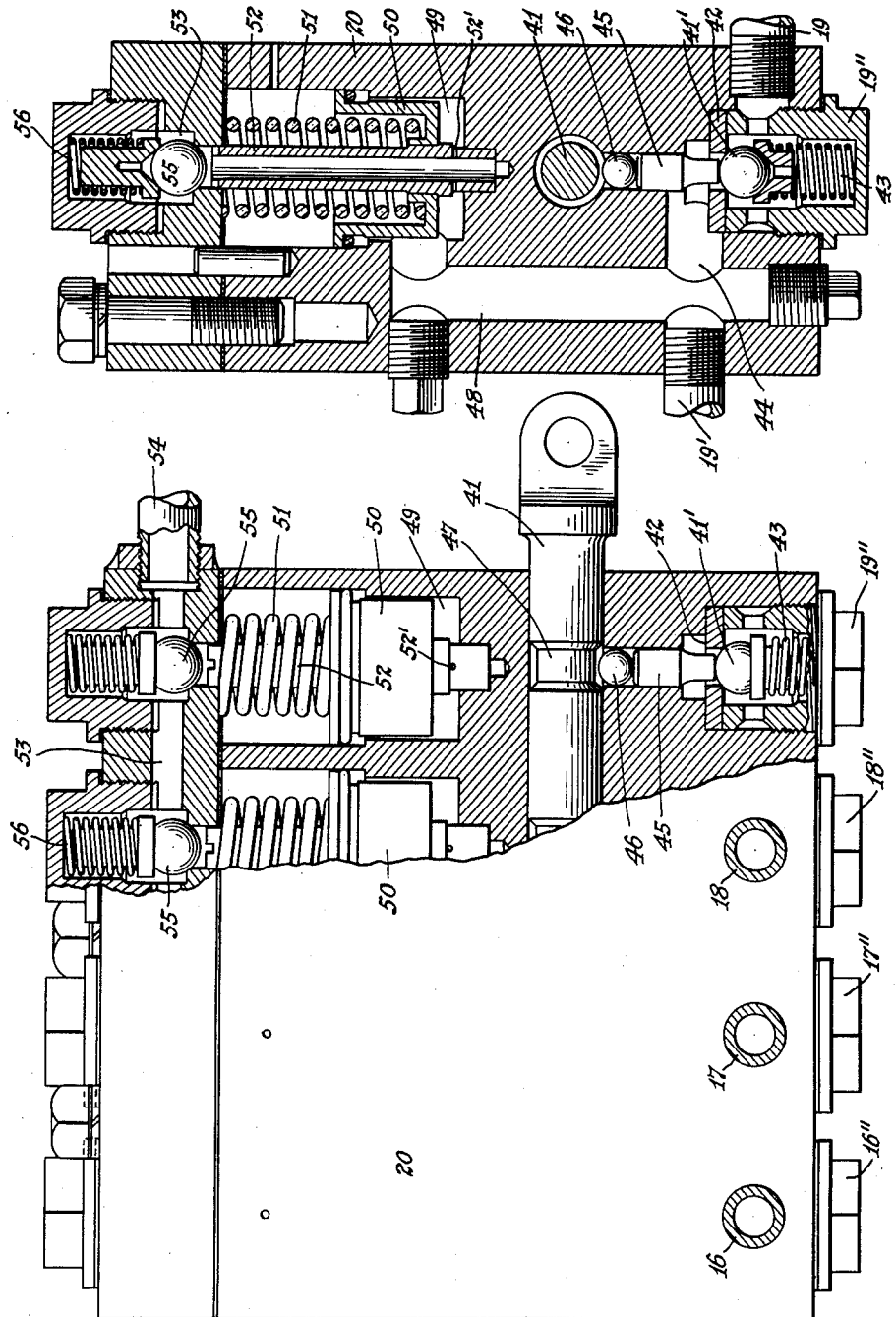

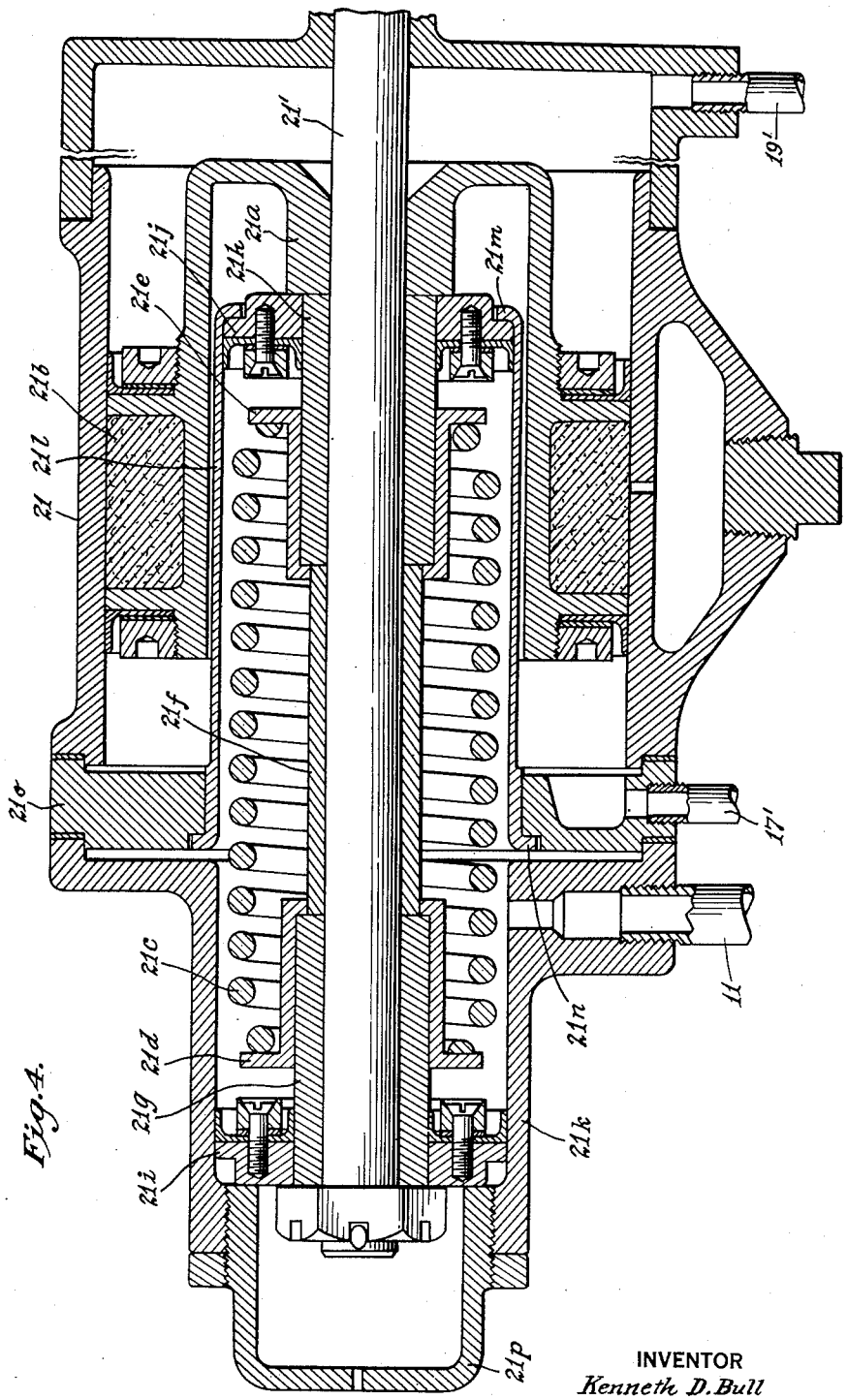

2,345,726

UNITED STATES PATENT OFFICE 2,345,726

PRESELECTING MECHANISM

Kenneth D. Bull, Oak Tree, N. J., assignor to Mack Manufacturing Corporation, Long Island City, N. Y., a corporation of Delaware Application March 12, 1941, Serial No. 382,921

7 Claims. (Cl. 74—472)

The present invention relates to selecting and shifting mechanism for motor vehicle transmissions and embodies, more specifically, an improved power operated mechanism wherein the vehicle clutch and change speed gears are controlled in a properly coordinated fashion by means of suitable power operated elements.

The use of power such as fluid pressure for operating motor vehicle transmissions is well known as is also the use of such media for effecting the operation of the motor vehicle clutch. In the co-pending application of Theodore J. Zeller, Serial No. 301,746, assigned to the assignee of the present application, there is described a mechanism by means of which control of the vehicle clutch is effected by means of fluid pressure and suitable control mechanisms. The present invention utilizes the elements shown and described in this co-pending application, in order that the vehicle clutch may be properly controlled and, in addition thereto, provides mechanism for operating the transmission gearing.

In particular, the present invention seeks to provide an improved power operated mechanism by means of which control over the shifting operations for changing the transmission gearing may be effected in a manner to facilitate the effective operation of the vehicle.

More particularly, the present invention provides, in a power operated control mechanism for the transmission and clutch, a device by means of which a desired speed change operation may be selected manually and then automatically effected when the conditions for such operation are brought about. For example, the mechanism enables the operator of a motor vehicle to select in advance a desired speed change operation and then, without further control apart from the control of the motor vehicle throttle, cause the shifting operation to take place when the vehicle throttle is in its normally closed position.

In order that the invention may be understood more fully, reference will now be made to the accompanying drawings, wherein:

Fig. 1 is a schematic diagram illustrating the fluid system by means of which the present invention is utilized.

Fig. 2 is a view in side elevation showing the pre-selector valve mechanism utilized in connection with the present invention. This view is broken away and partly in section to illustrate, more fully, the parts of the valve assembly.

Fig. 3 is a view in section, taken on line 3—3 of Fig. 1 and looking in the direction of the arrows.

Fig. 4 is an enlarged view of one of the shifter cylinder mechanisms utilized for shifting the transmission gears.

Referring to Fig. 1, the fluid system will be seen to include a reservoir 10 within which a supply of a fluid such as air under pressure is maintained. A fluid from the reservoir 10 is carried through pipes 11 and 12 to a feed valve 13 by means of which the air pressure is reduced for operating the selecting mechanism. From the feed valve, the fluid flows through a pipe 14 to a control valve 15, indicated by an appropriate legend and shown diagrammatically inasmuch as the details of this valve form no part of the present invention. The valve merely serves to connect the pipe 14 with pipes 16, 17, 18 and 19, selectively. Each of the pipes 16, 17, 18 and 19 leads to a pre-selector valve 20 that is shown, in greater detail, in Figs. 2 and 3. This valve will be described in greater detail presently and it will be understood that the valve, at the proper time, directs the fluid from pipes 16, 17, 18 and 19 into the pipes 16', 17', 18' and 19', respectively, in order that the fluid may be supplied to the mechanism for shifting the gears of the vehicle transmission.

To accomplish the shifting of the transmission gears, two shifter cylinders are provided, these being illustrated at 21 and 22 in Fig. 1. These cylinders are of known construction, the details thereof forming no part of the present invention, each merely serving to move its respective shifter shaft 21' and 22' into either one of two positions.

One of the shifter cylinders is shown in Fig. 4 (illustrated as shifter cylinder 21) wherein the shifter shaft 21' is received within a sleeve 21—a carried by a piston 21—b. Fluid from conduit 19' is introduced into the cylinder at the right of piston 21—b while fluid from the conduit 17' is introduced thereinto at the left of the piston.

The shaft is located by means of a spring 21—c, seated between retainers 21—d and 21—e. The retainers are mounted on a sleeve 21—f carried by the shaft 21' and are located by means of sleeves 21—g and 21—h, respectively.

Over the sleeves 21—g and 21—h, seals 21—i and 21—j are respectively provided, the seal 21—i cooperating with a sleeve 21—k, while the seal 21—j cooperates with a retaining sleeve 21—l. The sleeve 21—l is formed with a limit flange 21—m and a locating flange 21—n that is suitably secured within a plate 21—o, carried by the cylinder 21.

To move the shifter shaft 21' to the left, as viewed in Fig. 4, fluid is admitted through the conduit 19' to exert a pressure on the piston 21—b, forcing it to the left. The sleeve 21—a forces the seal 21—j to the left and the sleeve 21—h also moves retainer 21—e to the left, compressing the spring 21—c. The seal 21—i is prevented from moving by a retainer cap 21—p and will serve as a stop for the retainer 21—d. Upon permitting the fluid to escape from the cylinder, the shaft will return to its neutral position under the force exerted by the spring 21—c. Fluid from the conduit 11 will react on the seal 21—j and the sleeve 21—a to help return the shaft to its neutral position.

The shift in the opposite direction will be accomplished in an obvious manner by introducing fluid into the cylinder 21 through conduit 17'.

The clutch is controlled as described in the co-pending Zeller application above referred to by an automatic clutch valve 23, the clutch cylinder being shown at 24 and connected to the clutch valve by means of a pipe 25. Fluid pressure from the pipe 11 is supplied to the automatic clutch valve and the shifter shafts 21' and 22' control the operation of the clutch cylinder by means of poppets as illustrated in the co-pending Zeller application above referred to. Moreover, a centrifugal valve 26 and centrifugal cut-out valve 27 are provided as described in the above co-pending Zeller application, pipes 28 and 29 connecting the valve 26 and valve cut-out valve 27, respectively with the automatic clutch valve 23. The pipe 30 connects the centrifugal valve 26 with the cut-out valve 27 and a pipe 31 connects the centrifugal valve cut-out valve with the throttle valve 32 so that when the throttle is in the open position, the centrifugal valve cut-out valve will prevent the centrifugal valve from functioning. A pipe 33 connects the throttle valve with the pipe 14 and a pipe 34 connects the throttle valve with a manually operated valve 35, fluid under pressure being supplied thereto from pipe 14 by pipe 36. A throttle pedal 37 serves to open the valve 35 when the throttle pedal is depressed, thus causing the throttle valve 32 to be actuated.

It will be seen that the throttle pedal 37 controls the pre-selector valve 20 by means of links 38 and 39, connected together by a lost motion connection 40. Link 39 is connected to a control shaft 41, slidably mounted in the pre-selector valve 20 as illustrated in Fig. 2. The pre-selector valve 20 is provided with spring pressed ball check valve assemblies 16", 17", 18" and 19" that control respectively the flow of fluid between the pipes 16 and 16', 17 and 17', 18 and 18' and 19 and 19'. Each of these check valve assemblies includes a ball check 41' seated against a valve seat 42 by means of a spring 43. Pipe 19 supplies air under pressure to the interior of the valve assembly 19" and, when the ball check 41' is unseated, the fluid flows through the apertured valve plate 42 and into a passage 44 that communicates with the pipe 19'.

Within the pre-selector valve casing, there is provided a plunger 45 for each of the respective valve assemblies 16", 17", 18" and 19". These plungers 45 rest directly on the respective balls 41' and also seat balls 46 which project into the path of the shaft 41. The shaft 41 is provided with portions 47 of reduced diameter within which the balls 46 are normally received so that no downward pressure is exerted upon the plungers 45. When the throttle pedal 37 is depressed and the throttle is open, the shaft 41 is in its normal position as illustrated in Fig. 2 wherein the ball check valves 41' are closed. When, however, the throttle pedal 37 is released, the shaft 41 is moved axially to cause the plungers 45 to be depressed and the ball check valves 41' opened. This permits the fluid under pressure to flow from the selected pipe 16, 17, 18 or 19 to its companion pipe 16', 17', 18' or 19' to actuate the proper shifter cylinder in the desired manner to effect the appropriate speed change.

In operation, accordingly, it will be seen that the operator will first manipulate the control valve 15 to select a desired shifting operation. When this is done, fluid pressure from the pipe 14 is supplied to the selected pipe 16, 17, 18 or 19. However, no speed change is accomplished because the selector valve 20 prevents the flow of fluid from the pipes 16, 17, 18 or 19 to the respective pipes 16', 17', 18' or 19'. When the operator permits the throttle pedal 37 to be raised, the shaft 41 is moved axially to open the check valves 41' and the fluid is thus permitted to flow from the selected pipe 16, 17, 18 or 19 into the companion pipe 16', 17', 18' or 19' to actuate the proper shifter cylinder and thus accomplish the desired speed change operation. The actuation of the clutch will automatically be coordinated by means of the automatic clutch valve 23 and associated mechanism as previously mentioned.

In order that the air pressure supplied through the respective pipes 16', 17', 18' and 19' may be maintained in order to hold the pistons and shifter shafts in the shifted positions and against the pressure exerted by the return spring and air pressure, mechanism is provided to bleed air into these pipes by means of a by-pass valve that forms a part of the pre-selector valve assembly 20. This mechanism is shown in Fig. 3 and includes a duct 48 that communicates with the passage 44 and with a cylinder 49 within which a piston 50 moves. A spring 51 normally urges the piston downwardly and into the position shown in Fig. 3, the piston being provided with a hollow stem 52 that is adapted to communicate with a manifold 53 to which air under pressure is supplied through a pipe 54 that communicates with pipe 36. A ball check valve 55 is provided for each of the valve stems 52 and is normally seated by means of a spring 56, as will be readily apparent from Figs. 1 and 2. When the valve 41' is open, fluid pressure is exerted on the bottom of piston 50 to raise the stem 52 and open the ball check 55. This permits air under pressure to bleed through stem 52 and the small openings 52' in the bottom thereof so that the pressure within the pipe 19' (or any of the other selected pipes) is maintained. The openings 52' are small enough so that the by-pass will not hold the shifter cylinder piston in the shifted position when the main valve is opened for a shifting operation. If the pressure is quickly reduced in the passage 48, the spring 51 will seat the valve 55 before the air from the by-pass will have a chance to build up the pressure through the openings 52'. In this fashion, the shifter pistons and shifter shafts are maintained in their shifted positions until a further shifting operation is accomplished.

While the invention has been described with specific reference to the above drawings, it is not to be limited save as defined in the appended claims.

I claim:

1. Control mechanism for motor vehicle transmission gears comprising shifting elements to shift the transmission gears, fluid operated means to actuate the shifting means, means to control the vehicle engine, a plurality of pipes connected to the fluid operated means, a multiple valve connected to the pipes, means to actuate the multiple valve by the engine controlling means, a selector valve and piping connecting the selector valve with the multiple valve, and means to provide a source of fluid under pressure connected to the selector valve.

2. Control mechanism for motor vehicle transmission gears comprising shifting elements to shift the transmission gears, fluid operated means to actuate the shifting means, means for actuating the engine throttle from an idling position to open positions, a plurality of pipes connected to the fluid operated means, a multiple valve connected to the pipes, actuating means for the multiple valve, said last named actuating means normally maintaining the multiple valve in a closed position, means to operate said last named actuating means by the engine throttle actuating means to open the multiple valve when the engine throttle is in its idling position, a selector valve and piping connecting the selector valve with the multiple valve, and means to provide a source of fluid under pressure connected to the selector valve.

3. Control mechanism for motor vehicle transmission gears comprising shifting elements to shift the transmission gears, fluid operated means to actuate the shifting means, means for actuating the engine throttle from an idling position to open positions, a plurality of pipes connected to the fluid operated means, a multiple valve connected to the pipes, pressure responsive means for the multiple valve to maintain fluid pressures established in the pipes, actuating means for the multiple valve, said named actuating means normally maintaining the multiple valve in a closed position, means to operate said named actuating means by the engine throttle actuating means to open the multiple valve when the engine throttle is in its idling position, a selector valve and piping connecting the selector valve with the multiple valve, manual means to actuate the selector valve, a source of fluid pressure, and means to connect the source of fluid pressure to the selector valve, whereby the selector valve and the multiple valve connect the source of fluid pressure with a selected fluid operated means.

4. A control mechanism for a motor vehicle transmission gear comprising a shifting element to shift the transmission gear, a source of fluid under pressure, fluid operated means to actuate the shifting means, means to control the vehicle engine, means operated by said control means to control the flow of fluid, means to select between at least two parts of said fluid operated means upon which the fluid can be applied, and pressure responsive means to maintain a continued pressure application on the selected part of said fluid operated means.

5. Control mechanism for a motor vehicle transmission gear comprising a shifting element for shifting the transmission gear into two different ratios, a source of fluid under pressure, fluid operated means for actuating said shifting element to shift said gear into one ratio, fluid operated means for actuating said shifting element to shift said gear into the other ratio position, means to control the vehicle engine, multiple valve means actuated by said control means, fluid delivery means connecting said one of said valve means to each of said fluid operated means, and manually actuated means to connect said source selectively to one of said valve means.

6. Control mechanism for motor vehicle transmission gears comprising shifting elements to shift the transmission gears, a source of fluid under pressure, a plurality of fluid operated means to actuate the shifting elements, means to control the vehicle engine, valve means operated by said control means, including at least one valve for each fluid pressure operated means, fluid delivery means connecting one of said valve means to each of the fluid pressure operated means and manually operated valve means for connecting said source selectively to one of said valves to select a predetermined fluid pressure operated means for operation.

7. Control mechanism for a motor vehicle transmission gear comprising a shifting element to shift the transmission gear, fluid operated means to actuate the shifting element, a source of fluid pressure, means to control the vehicle engine, valve means operated by said control means to connect the fluid operated means and disconnected from said source of fluid pressure, manually operated means to connect said source to and disconnect said source from said valve means, and pressure responsive means to maintain a continued pressure application upon the fluid operated means when said source is not connected to said valve means.

KENNETH D. BULL.